Figure 1:
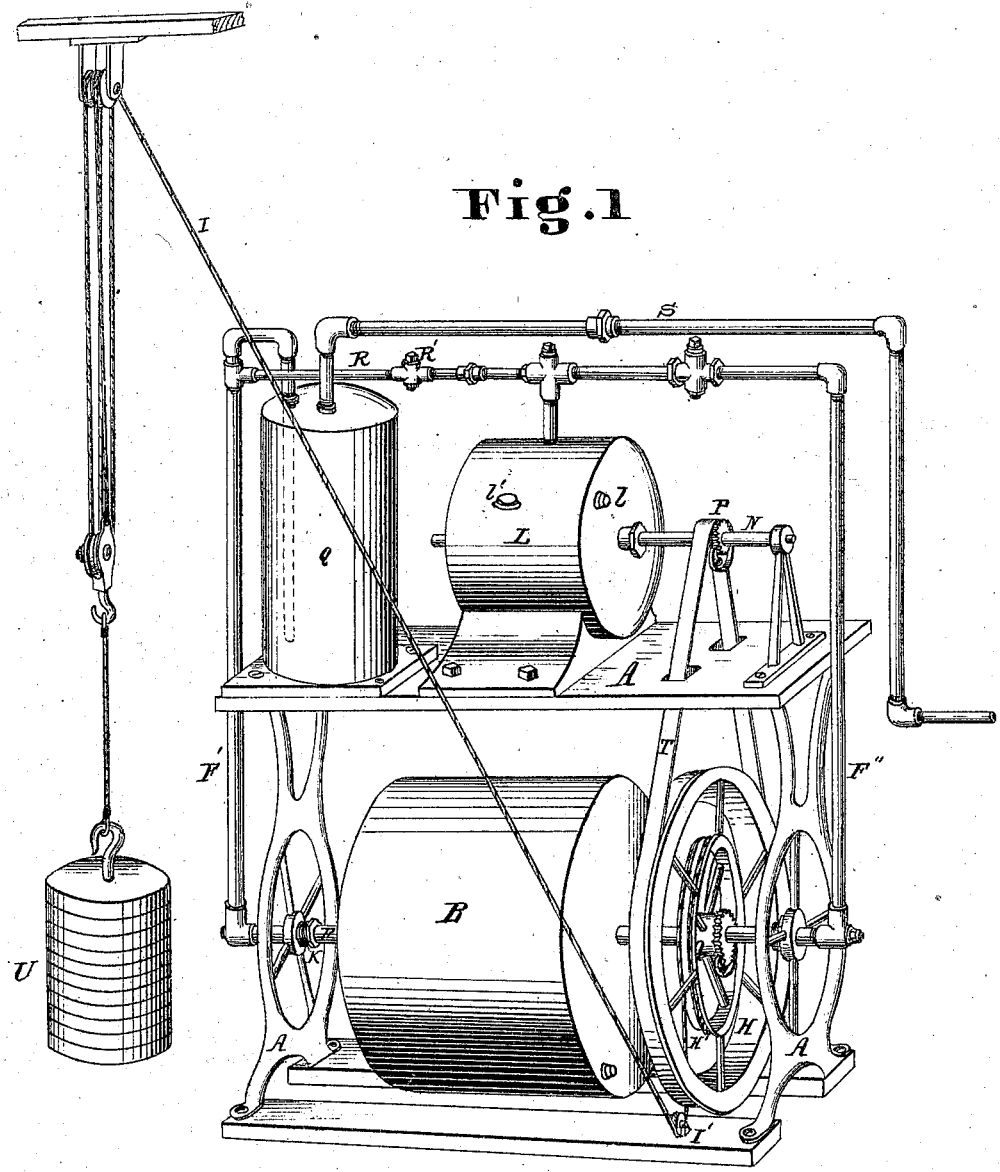

WILLIAM T. McMILLEN.

Improvement in Gas Machines.

No. 120,824.

2 Sheets--Sheet 1.

Patented Nov. 14, 1871.

Attest
J. Bode.
Herman Merrell

Inventor
William T. McMillen
By Wood & Boyd
attorneys &c.

2 Sheets--Sheet 2.
WILLIAM T. McMILLEN.
Improvement in Gas Machines.
No. 120,824.  Patented Nov. 14, 1871.
Fig. 2
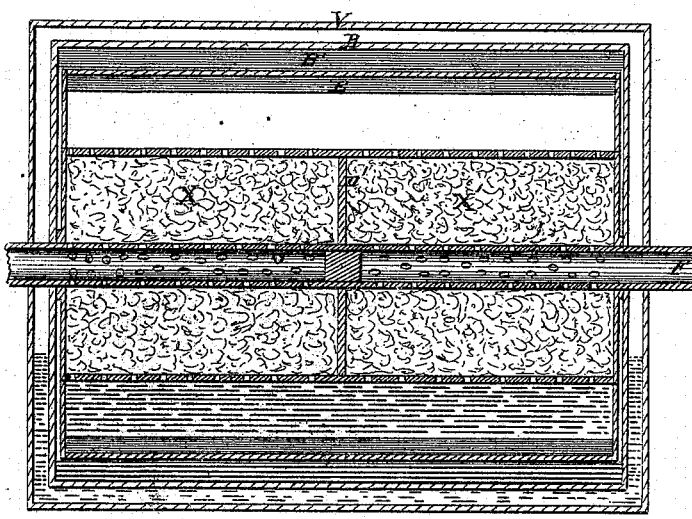
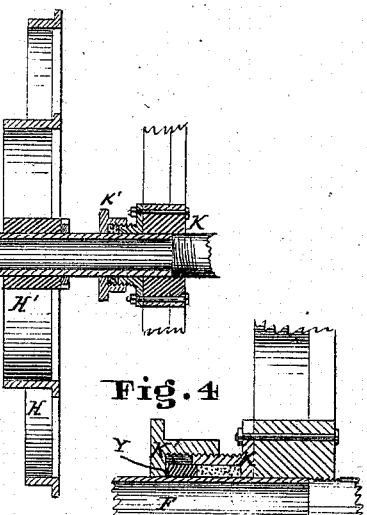
Fig. 4
Fig. 3
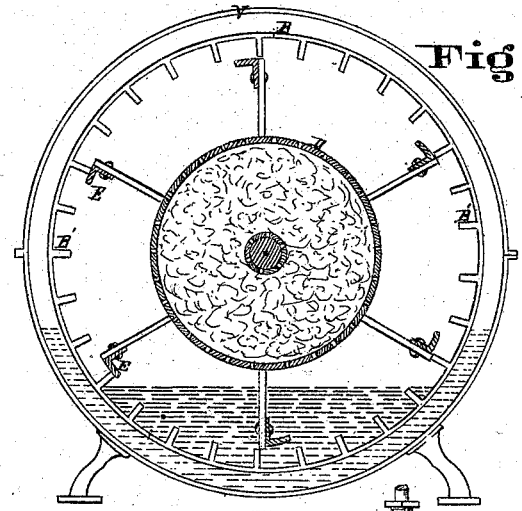
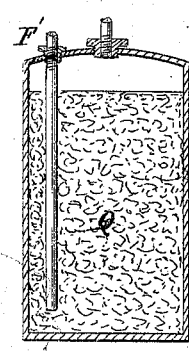
Fig. 5
Fig. 6
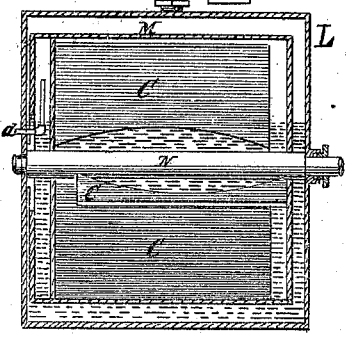
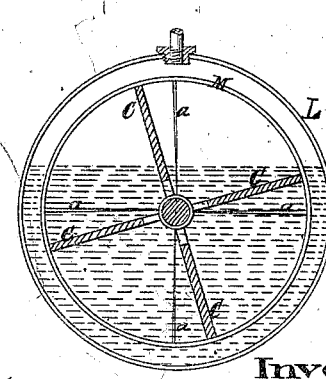
Fig. 7
Attest
J. Bode
Roman Morrell
Inventor
William T. McMillen
By Wood & Boyd
Attorneys &c
AM. PHOTO-LITHOGRAPHIC CO. N.Y. (OSBORNE'S PROCESS.)

120,824

UNITED STATES PATENT OFFICE.

WILLIAM T. McMILLEN, OF RICHMOND, INDIANA.

IMPROVEMENT IN GAS-MACHINES.

Specification forming part of Letters Patent No. 120,824, dated November 14, 1871.

*To all whom it may concern:*

Be it known that I, WILLIAM T. McMILLEN, of Richmond, in the county of Wayne and State of Indiana, have invented certain Improvements in Portable Gas-Generators, of which the following is a specification:

My invention relates to improvements in apparatus for the production of gas, for illuminating and heating purposes, from fluid hydrocarbon, without the intervention of artificial heat except in extremely cold weather, and consists in the novel arrangement of parts hereafter described.

Figure 1 is a perspective view of a machine embodying my invention. Fig. 2 is a longitudinal section of the cylinder B in Fig. 1. Fig. 3 is a cross-section of the same. Fig. 4 is a section of the stuffing-box K in Fig. 1. Fig. 5 is a vertical section of the carburizing-chamber Q in Fig. 1. Fig. 6 is a section of the cylinder L in Fig. 1, showing the fan-blades in elevation. Fig. 7 is a cross-section of said cylinder L in Fig. 1.

A is the frame of the machine, and should be sufficiently strong to resist any vibrations of the operative parts. B is the generating-cylinder, which should be made air-tight, and is rigidly attached to and revolves with the shaft F. Upon the inner periphery of the cylinder B, at intervals of about four inches, are projections or ribs B′, as shown in Figs. 2 and 3, which extend the entire length of the cylinder. Within the cylinder B, and rigidly attached to and revolving with the hollow shaft F, is a smaller cylinder, D, divided into two compartments $x$ $x'$ by the diaphragm D′. This cylinder D is finely perforated, and has numerous buckets, E, supported by arms, at some distance from its periphery, as shown by Figs. 2 and 3. The compartments $x$ $x'$ are filled with "excelsior" or some other suitable fibrous material. F is a hollow shaft, closed at the point where the diaphragm D′ cuts it, and has openings leading to and from the compartments $x$ $x'$. It loosely connects with the pipes F′ F″ within the stuffing-boxes K, and works in journals formed in the ends of the frame A. H is a loose pulley upon the shaft F, and is kept in place and to its work by a ratchet and spring-pawl. Within the pulley H is a drum, H′, of about half the diameter of the periphery of the pulley, which drum projects sufficiently on one side to allow the rope or chain I to be wound round it several times. By the novel construction of the drum H′ within the pulley H, instead of at one side or separately, as is the usual manner, I am able to economise not only material, but space, which is very desirable in portable gas-machines, both the pulley and drum occupying only the space used by the drum alone in the old manner. I′ is a friction-roller. K K are stuffing-boxes made with flanges at one end, through which they are securely bolted to the hubs formed in the ends of the frame, and are provided with nuts K′, as shown in Figs. 2 and 4, which nuts, after suitable packing is in place, are tightly screwed into place, thus forming a gas-tight joint. L is a stationary cylindrical air-and-water-chamber, which also contains the blower shown in Figs. 6 and 7. $l$ is a glass pane to enable the operator to regulate the water necessary. $l'$ is a removable stopper for the feeding of water. M is a rotary blower within the chamber L. It is rigidly attached at its ends to the shaft $m$, is cylindrical, with flaring suction-wing openings $a$ $a$ (Fig. 7) at one end, which are reversed at the opposite or escape end. These openings are made V-shaped to some degree; and I prefer to have them made by cutting out the metal at the base and on one side of the triangle formed by the opening and bending it over so as to form a wing, the wings being bent outwardly at one end and inwardly at the other, according whether the opening is for ingress to or egress from the blower. Between each opening is a blade or wall, $c$, attached to the cylinder of the blower, and at one end to one of the end wings, the other end being open. Alternately the open end is reversed, but all are cut away around the shaft so as to allow the water to flow through unobstructed, as shown in Fig. 6. The blower receives air through the pipe $d$, shown in Fig. 6, which leads from the open air to within the head of the blower, and as this pipe has its mouth below the water line, air drawn in cannot escape through the same aperture. At each end of the cylinder L is a stuffing-box around the shaft. P is a loose pulley on the shaft $n$, which is kept in place when at work by a ratchet and spring-pawl. Q is an auxiliary carburizing-chamber, preferably made vertical cylindrical, and is about two-thirds filled with excelsior or other fibrous material, which chamber also acts as a reservoir for the gas. F′ is a gas-pipe leading from the generator to the auxiliary carbureter, where it delivers the gas near the bottom. F'' is an air-pipe leading from air-chamber and blower L to the generating-chamber. R is an air-pipe leading from the air-chamber to the carbureter Q, the flow of air through which is regulated by a cock, R'. S is a service gas-pipe. The pulleys H and P are connected by a belt, T.

The operation of the machine is as follows: A small quantity of fluid hydrocarbon, as represented in Fig. 3, is poured into the cylindrical generating and carburizing-chamber B. The cylindrical chamber L is about two-thirds filled with water, as represented in Fig. 7. The weight U is raised by winding the rope I round the drum H', which is simply and easily done by turning the pulley H round by hand, it and the pulley P being loose on their shafts. This being done, the machine commences its operation. The weight U, drawing upon the rope I, gives a slow uniform rotary movement to the cylinder B, and the belt T at the same time sets the blower M in motion. The pulley H being turned to a true circle, the motion is smooth. As the cylinder B revolves the projections or ribs B' carry up with them some of the fluid, which in time is emptied on the succeeding ribs. At the same time the buckets E each fill while at the bottom, and as they rise, empty themselves upon the perforated surface of the inner cylinder D. These buckets are arranged to discharge themselves at alternate heights upon D. I am aware that carbureting-cylinders in gas-machines have been made filled with porous material, but occupying the greater portion of the interior of the exterior cylinder, and rigidly fixed therein. In such the result is that a portion of the fibrous filling is continuously below the line of the liquid, and practically useless for evaporating purposes, while the remainder is only sparingly moistened by capillary attraction, and such liquid as is carried up by the exterior cylinder in its revolution. By my arrangement the ribs on the outer cylinders keep the liquid well agitated to insure uniform evaporation, while the inner cylinder, with its arms and buckets, carries up a portion of the liquid, emptying it upon itself, thus keeping all the fibrous material uniformly moist and in working condition. The air being forced through the pipe F'' into the hollow shaft F, passes through the perforations of the shaft F within the compartment $x'$ and through the excelsior or other filling of the same, and enters the chamber B, the gas at the same time passing in reversed order through the openings of the shaft within the compartment $x$, and out through F' and into the further carburizing-chamber Q, from whence it passes through the excelsior of that chamber into the service-pipe S, when it is ready to burn for any purpose. The speed needed depends upon the consumption of the gas. For two burners not more than one revolution of the cylinder B per hour is necessary, and the weight U should be regulated accordingly. V is a jacket, divided on the plane of the axis, and is made to cover loosely the cylinder B. This jacket is necessary only in very cold weather, when I place it stationary, so that the generator B will revolve within it. It is then partially filled with water, as shown in Figs. 3 and 2, and a gas-jet or other heater placed under it, by means of which the water is warmed, and, as the cylinder B revolves through this water, sufficient heat is conveyed to the hydrocarbon to insure its rapid vaporization.

I claim as new and my invention—

1. An automatic gas-machine, composed of the air-blower L and carbureter B, in combination with the auxiliary carbureter and reservoir Q, arranged as herein described.

2. The combination of cylinder D having buckets E, with the cylinder B with its ribs B', both being rigidly attached to and revolving with hollow shaft F, substantially as herein set forth.

3. In combination with the generator of a gas-machine the removable jacket V, made in two parts, substantially as herein described and shown.

4. The blower M with its wings C fastened alternately to the ends of its case, and flaring suction-wing openings $a$ $a$ reversed at each end, in combination with the case L, substantially as described and set forth.

5. The drum H', arranged within the pulley H, as herein described.

6. In combination with a gas-generating machine the arrangement of the stuffing-box K, as herein described.

WILLIAM T. McMILLEN.

Witnesses:
  EDWARD A. BOYD,
  H. C. BARNETT. (64)